(No Model.) 2 Sheets—Sheet 1.
E. WESTON.
SYSTEM OF GENERATING AND REGULATING ELECTRIC CURRENTS.
No. 310,763. Patented Jan. 13, 1885.
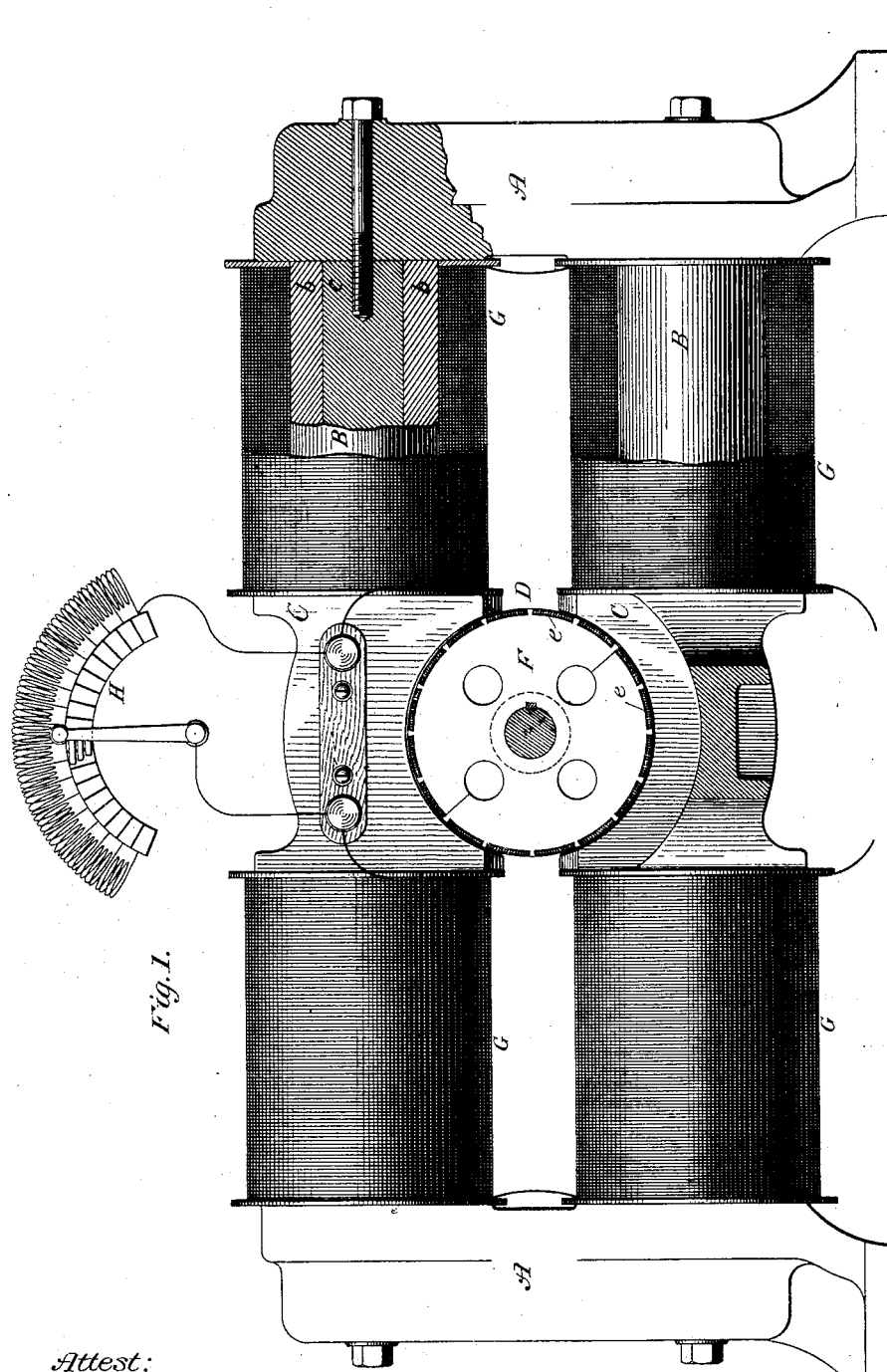

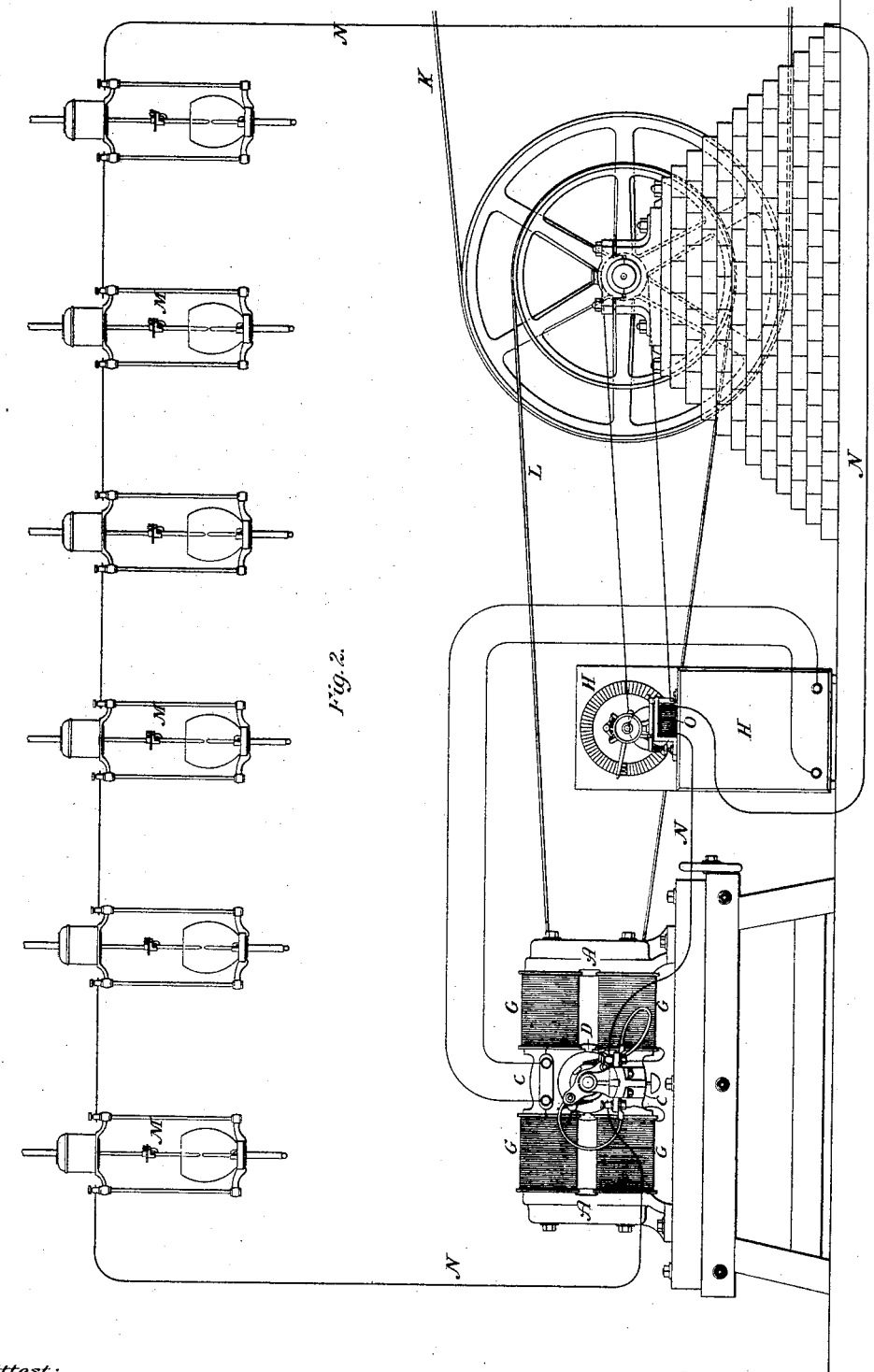

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

SYSTEM OF GENERATING AND REGULATING ELECTRIC CURRENTS.

SPECIFICATION forming part of Letters Patent No. 310,763, dated January 13, 1885.

Application filed April 26, 1884. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Systems of Generating and Regulating Electric Currents, of which the following is a specification, reference being had to the drawings accompanying and forming a part of the same.

My present invention relates, mainly, to systems of electrical generation and distribution, in which the devices for utilizing the current are connected in series in the circuit from one or more electrical generators. In systems of this kind the current generated is liable to variations due to several causes—for instance, variations of the resistance of the external circuit, variations of the power driving the machine and the like. To provide against these variations and to maintain a uniform flow of current some system of regulation is required.

Regulation may be effected in various well-known ways, the most common of which are varying the magnetic intensity of the field-magnets, varying the running-speed of the generator, shifting the position of the commutator-brushes, and varying the resistance of the working-circuit.

My present invention relates to that method of regulation which involves the variation of the magnetism of the field, and more particularly to overcoming certain difficulties in the operation of the dynamo, which are incident to this mode of regulation.

As is well known, there are certain points on the commutator of a dynamo-machine of any of the types ordinarily in use at which the brushes should be applied for securing the best results when the dynamo is running under given conditions. When the brushes are applied at these points, which are called the "maximum points," not only are the maximum effects produced, but the spark at the brushes is reduced to a minimum. It is accordingly very desirable that the brushes should always be so adjusted as to bear upon the maximum points of the commutator, since otherwise the dynamo is working at a disadvantage, and sparks are produced which injure the commutator and brushes. In dynamo-machines as they are ordinarily constructed the maximum points on the commutator are not constant, but shift their position not only with changes in the strength of the current generated, but also with changes in the intensity of the field, so that, even if the strength of the current be maintained uniform, if the intensity of the field be varied to compensate for changes of resistance in the working-circuit, the position of the maximum points will be changed and the brushes will be out of adjustment. The cause of this, so far as I am at present able to ascertain, is as follows: In dynamo or magneto electric machines there are what are termed "polar lines of the field and armature"—in other words, the lines passing through the points of maximum magnetic effect. The polar line of the field of a dynamo-machine is primarily determined by the magnetizing effects of the coils wound upon it, that of the armature mainly by the inductive influence of the field. In machines, however, constructed in the usual manner the position of these polar lines is affected by certain disturbing influences. For example, when the machine is in action, the currents induced in the armature-core and those traversing the coils upon the same tend to fix the position of the polar line of the armature at right angles to that of the field, and as a result the polar line of the armature will lie between the two points indicated, its position being determined by the relative influence of the forces acting to produce it. With the armature wound with coils connected in series and the commutator-plates connected with the junctions between the coils, the maximum points on the commutator correspond with the neutral magnetic points of the armature, and with any system of winding the maximum points on the commutator bear a definite relation to the polar line of the armature and move with it. As the polar line of the armature of machines constructed in the ordinary way is fixed by the relative influence of two forces of which the induction of the field is one, it is obvious that if the machine be regulated in the manner to which I have referred the maximum and neutral magnetic points of the armature will be shifted in position for every variation of the strength of the field-magnets, so that in running the machine with a working-circuit of varying resistance the maximum and neutral magnetic points of the armature will be shifted in position for every variation of strength of the field-magnets, and the commutator-brushes will not always bear upon the maximum points of the commutator. This produces sparks which injure the commutator and brushes, and the only practicable means of obviating this is to shift the brushes for every variation of electro-motive force, or the strength of the field-magnets producing the same. It is the subject of my present invention to overcome this difficulty, and I accomplish this by constructing the dynamo-machine in such manner that the position of the polar line of the armature shall, within the normal working-limits of the machine, be determined substantially by the inductive force of the field alone, and with this machine I combine a regulator for varying the magnetic intensity of the field within such limits. In a previous patent granted to me—viz., No. 278,641, dated May 29, 1883—I have set forth the general principles of the construction of this machine. As there described, it is to be so organized that the inductive influence of the field-magnets, in determining the polarity of the armature-core, shall so far preponderate over that of the induced currents circulating in and around the armature itself, and all other disturbing forces, that the effect of the latter may practically be disregarded. In other words, I construct the machine in such manner that its parts, both from their peculiar construction and from their relation to each other, shall contribute, as far as possible, to increasing the inductive influence of the field or the armature and diminishing the influence of other causes.

In illustration of the general plan of construction, I employ heavy and massive field-magnets wound with a large number of convolutions of insulated wire in coils, forming a circuit independent of or derived from the main or armature circuit, so as to create a very intense field. The field-magnets are formed with closely-approaching pole-pieces with curved faces, between which is mounted a cylindrical armature, the core of which is of such diameter as to nearly fill the space between the poles of the field. The iron core of the armature is constructed in such a manner as to constitute, as nearly as possible, a true keeper, to complete the magnetic circuit between the field-magnets. The armature-core is sectional in form, to prevent the circulation of induced currents within it, which would operate to disturb its proper polarity and reduce the efficiency, and it is wound with a suitable number of coils longitudinally from side to side. These coils are brought up as near as possible to the faces of the field-magnets, so as to develop the requisite electro-motive force with as few convolutions of armature-coils as possible, and thereby reduce to a minimum the polarizing influence of the armature-current. With a machine thus constructed I employ a device for varying the intensity of the field, and thereby regulating the machine with respect to the electro-motive force developed by it. The regulating device which I prefer consists of a variable resistance in the field-circuit, the latter being independent of or derived from the main or working circuit. By varying the resistance to compensate for variations or fluctuations in the resistance of the main circuit the amount of current is permitted to flow through the field-circuit which is requisite for producing the normal current for running any number of devices in the main circuit, from the least to the greatest number for which the machine is designed.

The invention is not limited to any special form of regulator for varying the intensity of the field, it being only necessary, as indicated above, that the least intensity of the field, when the machine is running under the normal working conditions, shall be sufficient to fix the polar line of the armature coincident, or practically so, with its own.

This machine, when combined with a regulator of the kind described for varying the magnetic intensity of the field, requires no further adjustment of the brushes after they have been once properly set, as the position of the neutral magnetic points of the armature, and consequently of the maximum points of the commutator, remains fixed. In this combination my invention is chiefly comprised.

I will now indicate more fully, by reference to the accompanying drawings, the form in which I prefer to construct the elements comprised in this combination.

Figure 1 is a view, in side elevation and partly in section, of the machine with the rheostat shown in diagram. Fig. 2 is an illustration of the system comprising a machine, a series of arc lamps, and the regulator.

Referring to Fig. 1, A A are the end pieces of the machine.

B B are heavy iron cores, made of single pieces, or composed of soft iron cylindrical or oval parts b, with cores c of harder iron.

C C are massive pole-pieces, cast in one piece with the cores b. The pole-pieces are bored out so as to follow the contour of the armature. The cores and pole-pieces are bolted to the end pieces, A A, and form the frame of the machine.

Between the pole-pieces C C is mounted a cylindrical armature, D, composed of a number of iron disks, F, one only of which is shown, keyed to a central shaft. In the surface of the cylinder thus formed are cut recesses $e$, parallel to the axis, in which are laid the coils.

The manner of winding and connecting the armature-coils may be varied; but I prefer the sytem shown, in a previous patent granted to me June 13, 1882, No. 259,618, using, however, two layers of wire in each recess, instead of four, as set forth in the patent referred to.

G G are the field-magnet coils. They are composed of a number of convolutions or layers of insulated wire, and are connected to the binding-posts of the machine, as shown in Fig. 2, so as to form a circuit derived from that of the main or working circuit. At some point in this circuit, preferably between the two upper coils, I include a rheostat or variable resistance, H.

The mass of iron in the field-magnets, and the number of convolutions around them, aided by the special construction of the armature, which, offering a practically-continuous path of magnetic material across the poles, acts practically as a keeper to maintain a closed magnetic circuit, are such as to maintain the polar line of the armature in a fixed position coincident with that of the field, or practically so, for all conditions within the practical working limits of the machine. These limits of necessity vary in different machines. Assuming, for example, that the machine is designed to run twenty arc lamps in series, the influence of the field in fixing the position of the polar line of the armature should be so determined by the plan of construction indicated herein, or in the Patent No. 278,641, referred to above, that it will be sufficient to maintain such coincidence, whatever may be the number of lamps in circuit, from one to the full number, although the strength of the field is increased or decreased according to the number of lamps in action.

To produce the changes in the magnetic intensity of the field requisite for maintaining a constant flow of current in the working-circuit under the varying conditions of resistance to which the external circuit is exposed, I use the variable resistance or rheostat described above. The range of the rheostat is such as to permit the strength of current in the field-circuit to be varied so as to produce the intensity of field requisite for running any number of lamps, from one to the full number, for which the machine is designed.

If a machine and rheostat having the mutual relations herein described be combined in the manner set forth, it is evident that the number of lamps or similar devices in circuit may be varied at will without any change in the adjustment of the brushes.

Although the rheostat may be operated by hand, I prefer to control it automatically through the instrumentality of an electro-magnet included in the circuit. This system has been explained by me in a former patent, No. 278,640, dated May 29, 1883, and is illustrated in Fig. 2, where K designates the engine, L the belt for driving the dynamo. N N is the main or working circuit, M a given number of lamps connected therewith in series. A magnet, O, is included in the main circuit, and controls the action of a rheostat, H, included in the field-circuit of the machine.

The construction and mode of operation of the devices for effecting the regulation are similar to those described in the patent referred to.

Although I prefer to use the form of dynamo-machine and regulating device which I have shown, my invention is not limited to this particular form of dynamo or to the regulating device which I have described. It is obvious that the principles of construction which I have explained may be applied to other forms of dynamo-machines, and any suitable regulating device may be used for varying the intensity of the field—as, for example, when the field-coils are in the main circuit, the current exciting them may be varied by shunting them through a variable resistance; or the direction of the current may be reversed through more or less of the convolutions of the field-coils; or neutralizing-coils may be used with means for varying the current flowing through them; or the distance of the poles from the armature may be varied; or the intensity of the field or its effect on the armature may be varied or regulated in other ways. Nor is my invention confined to systems of regulation which have for their object maintaining constant strength of current in the working circuit, since it may be applied with equal advantage in cases where the intensity of the field is varied to change the strength of current in the working-circuit. In another application I have described a dynamo-machine constructed for providing against slight fluctuations in the resistance of the external circuit, such as are likely to be caused by the ordinary operation of the translating devices. In Patent No. 278,640, heretofore granted to me, I have also described a system of regulation involving a machine having its field-coils in derived circuit, in combination with translating devices in series, an adjustable resistance in the field-circuit, and an electro-magnet in the main circuit for operating such resistance. These are matters, therefore, which I do not claim herein, as my present invention is limited to the combination, with a dynamo-machine constructed for maintaining the polar lines of the armature and field coincident through all variations in the magnetic intensity of the field within the normal working limits of the machine, of a regulating device for varying the magnetic intensity of the field within such limits.

What I claim is—

1. The combination, with an electric circuit and translating devices included in series therein, of a dynamo-electric machine having the maximum points on the commutator maintained in approximately the same position, notwithstanding variations in the intensity of the field, within the working limits of the machine, substantially as described, and means for varying the intensity of the field within such limits, whereby a constant current is maintained for all normal variations in the resistance of the external circuit without adjustment of the commutator or brushes bearing thereon, as hereinbefore set forth.

2. The combination, with an electric circuit and translating devices included in series therein, of a dynamo-electric machine with its field-coils in derived circuit, and having the polar line of the armature maintained approximately coincident with that of the field, under all variations of the magnetic intensity of the field, within the normal working limits of the machine, substantially as described, and a variable resistance or rheostat in the field-current adapted to vary the current flowing through said circuit, and thereby the magnetic intensity of the field, in such manner as to compensate for variations in the resistance of the main circuit and within the working limits of the machine, as hereinbefore set forth.

3. The combination, with an electric circuit and translating devices included in series therein, of a dynamo-electric machine the field and armature magnets of which are constructed relatively to each other, in substantially the manner described, whereby the polar lines of both are maintained approximately coincident, the field-coils in a derived circuit, an electro-magnet in the main circuit, and mechanism operated or controlled thereby for varying the current passing in the field-coils within such limits that the coincidence of the polar lines is not affected, substantially as set forth.

In testimony whereof I have hereunto set my hand this 25th day of April, 1884.

EDWARD WESTON.

Witnesses:
HENRY A. BECKMEYER,
FRANK N. CRANE.